(12) United States Patent
Suciu et al.

(10) Patent No.: US 10,202,941 B2
(45) Date of Patent: Feb. 12, 2019

(54) REVERSE CORE TURBINE ENGINE MOUNTED ABOVE AIRCRAFT WING

(71) Applicant: United Technologies Corporation, Hartford, CT (US)

(72) Inventors: Gabriel L. Suciu, Glastonbury, CT (US); Jesse Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 720 days.

(21) Appl. No.: 14/441,633

(22) PCT Filed: Mar. 4, 2013

(86) PCT No.: PCT/US2013/028844
§ 371 (c)(1),
(2) Date: May 8, 2015

(87) PCT Pub. No.: WO2014/074135
PCT Pub. Date: May 15, 2014

(65) Prior Publication Data
US 2015/0300293 A1    Oct. 22, 2015

Related U.S. Application Data

(60) Provisional application No. 61/725,172, filed on Nov. 12, 2012.

(51) Int. Cl.
*B64D 27/00* (2006.01)
*F02K 1/64* (2006.01)
*F02C 3/045* (2006.01)
*F02K 3/06* (2006.01)
(Continued)

(52) U.S. Cl.
CPC .................. *F02K 1/64* (2013.01); *F02C 3/04* (2013.01); *F02C 3/045* (2013.01); *F02C 6/00* (2013.01); *F02K 3/06* (2013.01); *F05D 2250/314* (2013.01)

(58) Field of Classification Search
USPC ........ 60/226.1, 226.2, 226.3, 262, 770, 771, 60/805
See application file for complete search history.

(56) References Cited

U.S. PATENT DOCUMENTS 2,704,434 A * 3/1955 Schmitt ..................... F02K 3/12
                                                      60/263
4,222,233 A * 9/1980 Johnson ............... B64C 29/005
                                                      60/225

(Continued)

OTHER PUBLICATIONS

International Preliminary Report on Patentability for International Application No. PCT/US2013/028844 dated May 21, 2015.

(Continued)

*Primary Examiner* — Binh Q Tran
(74) *Attorney, Agent, or Firm* — Carlson, Gaskey & Olds, P.C.

(57) ABSTRACT

A gas turbine engine has a fan inlet and a fan configured to deliver air to an exhaust nozzle. A core gas turbine engine. including in serial order extending further into the engine, a core turbine section, a combustor and a core compressor section. A core engine inlet duct is spaced from the fan inlet. A method is also described.

12 Claims, 3 Drawing Sheets

(51) Int. Cl.
*F02C 6/00* (2006.01)
*F02C 3/04* (2006.01)

(56) References Cited

U.S. PATENT DOCUMENTS

| | | | | |
|---|---|---|---|---|
| 4,222,234 A * | 9/1980 | Adamson | ............ | B64C 29/0066 |
| | | | | 244/23 D |
| 5,279,109 A * | 1/1994 | Liu | ......................... | F02C 7/052 |
| | | | | 60/39.092 |
| 6,260,800 B1 | 7/2001 | Snell | | |
| 6,487,845 B1 * | 12/2002 | Modglin | .................... | F02K 1/60 |
| | | | | 239/265.29 |
| 8,176,725 B2 * | 5/2012 | Norris | ..................... | F02C 3/107 |
| | | | | 60/226.1 |
| 8,516,789 B2 * | 8/2013 | Kupratis | ................. | F02K 3/065 |
| | | | | 60/226.1 |
| 9,194,330 B2 * | 11/2015 | Wood | ....................... | F02K 3/075 |
| 9,249,731 B2 * | 2/2016 | Sidelkovskiy | ............ | F02C 7/20 |
| 2002/0112535 A1 | 8/2002 | Guillet et al. | | |
| 2007/0051091 A1 | 3/2007 | Rolt | | |
| 2011/0056208 A1 | 3/2011 | Norris | | |
| 2013/0284822 A1* | 10/2013 | Howarth | ................... | F02K 1/70 |
| | | | | 239/11 |

OTHER PUBLICATIONS

PCT Search Report for PCT/US13/28844.

\* cited by examiner

REVERSE CORE TURBINE ENGINE MOUNTED ABOVE AIRCRAFT WING

CROSS-REFERENCE TO RELATED APPLICATION

This application claims priority to U.S. Provisional Application No. 61/725,172, filed Nov. 12, 2012.

BACKGROUND OF THE INVENTION

This application relates to a reverse core gas turbine engine which is to be mounted above an aircraft wing.

Gas turbine engines are known and, when utilized in aircraft applications, include a fan delivering air into a compressor section. The air is compressed and passed downstream into a combustor where it is mixed with fuel and ignited. Products of this combustion pass downstream over turbine rotors, driving them to rotate.

Historically, the engines have had the fan, then the compressor, then the combustor and, finally, the turbine section serially aligned in an axial direction extending into the engine and all centered on a common axis. More recently, so called reverse core engines have been proposed wherein the components are the fan, then the turbine, then the combustor, then the compressor as one moves serially along an axial direction into the engine. The reverse core engine allows a more compact arrangement. In addition, it is known that the reverse core engine can be centered on a center axis which is not aligned with a center drive axis for the fan.

The use of a reverse core engine has not been proposed for mounting at a location above an aircraft wing.

SUMMARY OF THE INVENTION

In a featured embodiment, a gas turbine engine has a fan inlet and a fan configured to deliver air to an exhaust nozzle. A core gas turbine engine includes, in serial order extending further into the engine relative to the fan inlet, a core turbine section, a combustor and a core compressor section. A core engine inlet duct is spaced from the fan inlet relative to a fan radial center.

In another embodiment according to the previous embodiment, the core gas turbine engine is centered along a first axis. The fan rotates about a second axis. The first and second axes are non-parallel.

In another embodiment according to any of the previous embodiments, a core engine inlet duct extends to a turning section where the air is turned to communicate with the core compressor section.

In another embodiment according to any of the previous embodiments, a particle separator is positioned to allow removal of impurities from the air prior to it turning into the core compressor section.

In another embodiment according to any of the previous embodiments, the outlet nozzle is not centered about an axis of the fan, but rather is positioned to be larger on one side of the axis of the fan.

In another embodiment according to any of the previous embodiments, a free turbine is positioned downstream of the core engine turbine. The free turbine receives products of combustion from the core engine turbine, and drive the fan.

In another embodiment according to any of the previous embodiments, the free turbine drives the fan rotor through a gear reduction.

In another featured embodiment, an aircraft has a wing mounting an engine. The engine includes a fan inlet and a fan configured to deliver air to an exhaust nozzle. A core gas turbine engine includes in serial order extending further into the engine, a core turbine section, a combustor and a core compressor section, a core engine intake duct. The exhaust nozzle is vertically above a leading edge of the wing. The inlet duct is vertically below a leading edge of the wing.

In another embodiment according to the previous embodiment, the core gas turbine engine is centered along a first axis. The fan rotates about a second axis. The first and second axes are non-parallel.

In another embodiment according to any of the previous embodiments, a core engine inlet duct extends to a turning section where the air is turned to communicate with the core compressor section.

In another embodiment according to any of the previous embodiments, a particle separator is positioned to allow removal of impurities from the air prior to it turning into the core compressor section.

In another embodiment according to any of the previous embodiments, an outlet nozzle is not centered about the second axis but rather is positioned to be larger on a vertically upper side of the second axis.

In another embodiment according to any of the previous embodiments, a free turbine is positioned downstream of the core engine turbine. The free turbine receives products of combustion from the core engine turbine, and drive the fan.

In another embodiment according to any of the previous embodiments, the free turbine drives the fan rotor through a gear reduction.

In another featured embodiment, a method of operating an engine includes the steps of passing air in an inlet of a fan along a first direction, and passing core air into a core duct inlet at a location radially offset from a fan center axis of the fan. The core air is then turned along an acute angle in a direction having at least a component in a reverse direction relative to the fan center axis, and in a direction radially toward the fan center axis. The core air then enters a core engine to sequentially travel through a compressor section, a combustor, and a turbine section.

In another embodiment according to the previous embodiment, the core air downstream of the turbine section passes over a free turbine, driving the free turbine to rotate. The free turbine in turn drives the fan.

In another embodiment according to any of the previous embodiments, the free turbine drives the fan through a gear reduction.

In another embodiment according to any of the previous embodiments, the fan inlet is positioned vertically above an aircraft wing. The core inlet duct is positioned vertically below the aircraft wing.

In another embodiment according to any of the previous embodiments, the fan inlet is positioned vertically above an aircraft wing, and the core inlet duct is positioned vertically below the aircraft wing.

In another embodiment according to any of the previous embodiments, a particle separator is positioned in the core air flow downstream from the core inlet duct, and removes impurities prior to the core air entering the core engine.

These and other features may be best understood from the following drawings and specification.

DETAILED DESCRIPTION

Figure 1:
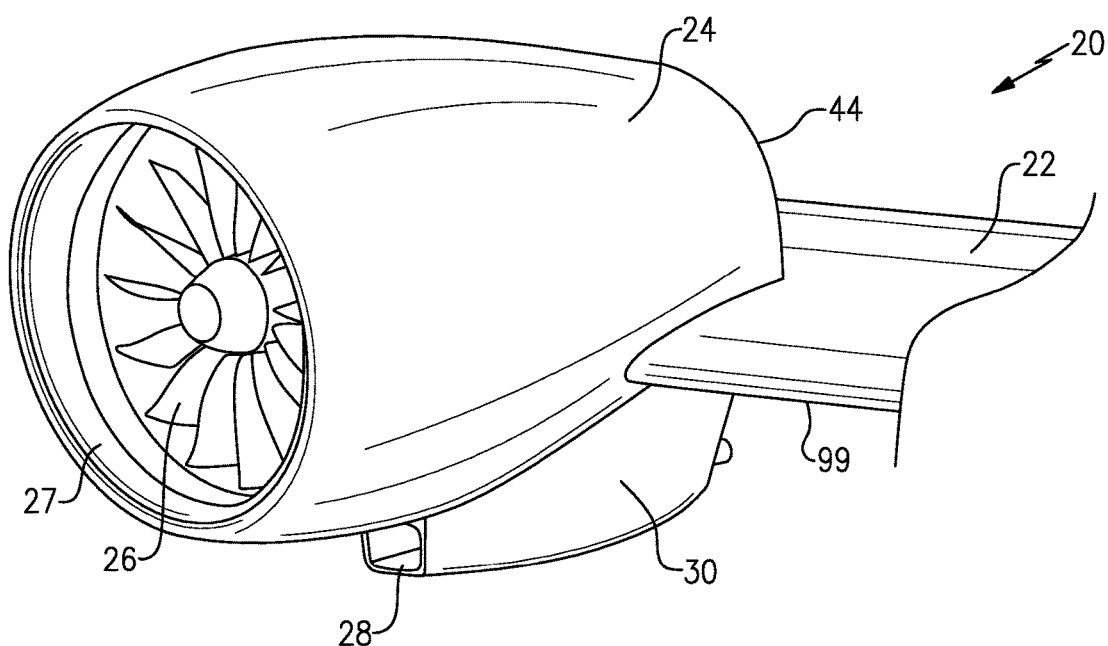
FIG. 1 shows an aircraft wing.

As shown in FIG. 1, an aircraft 20 includes a wing 22, with an engine 24 mounted to be vertically above the wing. A fan 26 is positioned inwardly of a fan inlet duct 27.

A core inlet duct 28 is positioned vertically below the fan inlet 27 and leads to a duct body 30.

As can be seen, an engine outlet 44 is vertically above a wing leading edge 99, while core inlet duct 28 is below it.

Figure 2A:
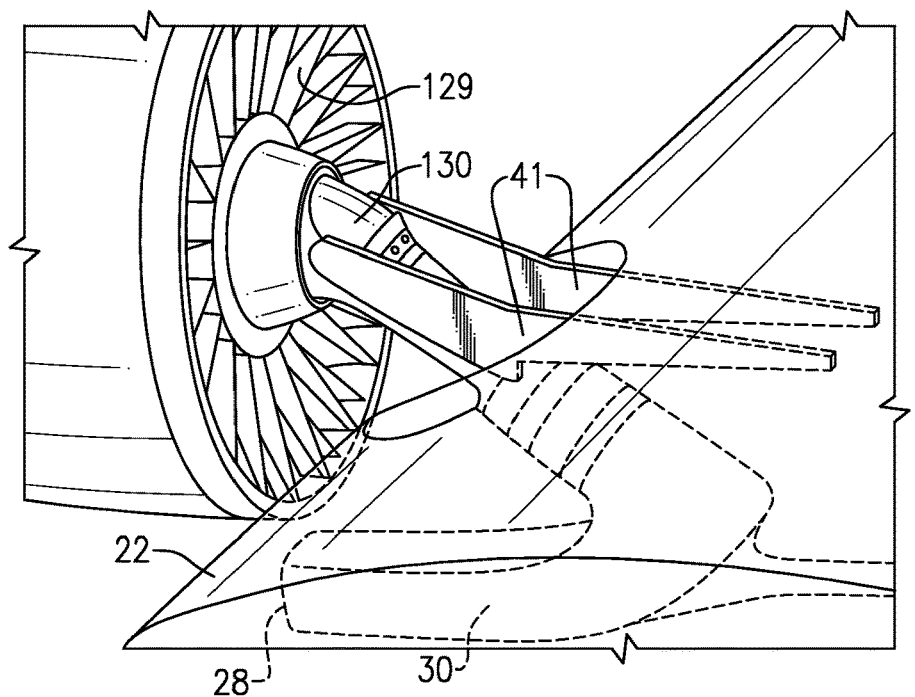
FIG. 2A shows mount details of an engine.

As shown in FIG. 2A, vanes 129 are positioned at a rear end adjacent outlet 44. A core engine 130 is positioned inwardly from the vanes 129, and the core inlet duct 28 and the duct 30 communicates with the core engine 130. Pylons 41 mount the engine within a central space in the wing 22.

Figure 2B:
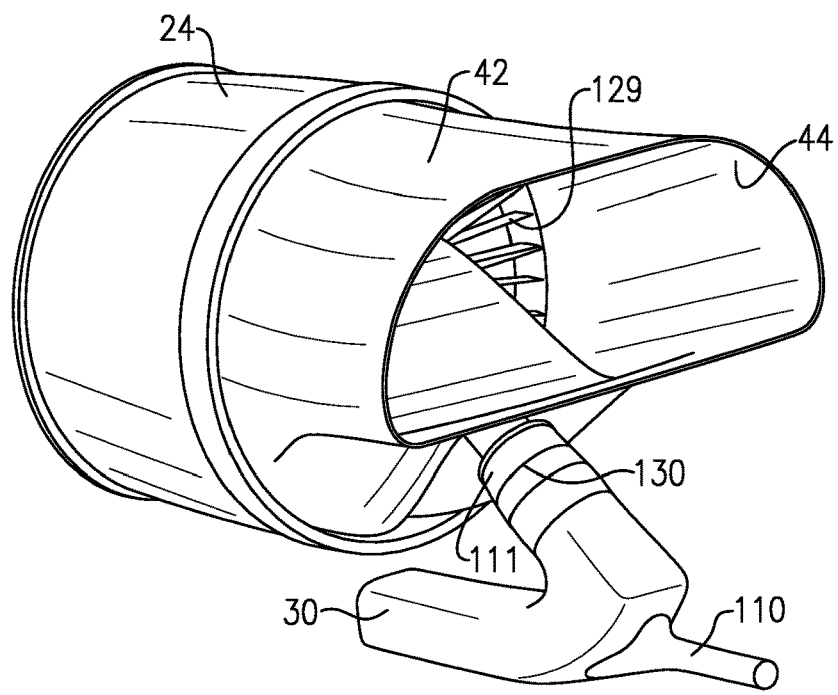
FIG. 2B shows flow details of the FIG. 2A engine.

As shown in FIG. 2B, an outlet 110 serves as a particle ejector, as will be explained below. Further, a duct 111 separates the core engine components from the remainder of the engine 24. An outlet nozzle 44 serves as a main outlet for the engine.

Figure 3:
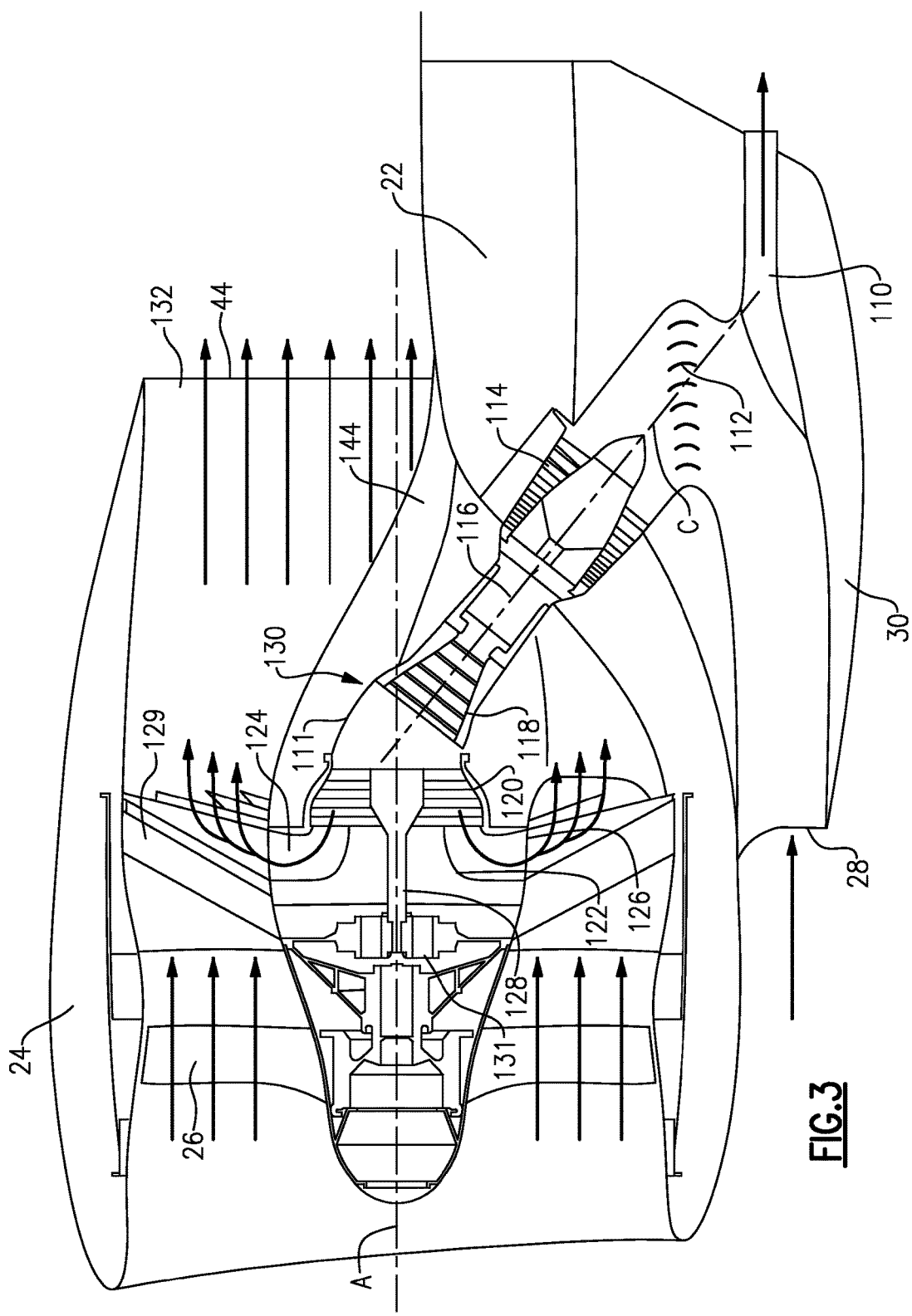
FIG. 3 is a cross-sectional view through the engine.

FIG. 3 is a cross-sectional view through the engine 24.

As shown, air driven by the fan 26 moves through a bypass duct as propulsion air and outwardly of the outlet 44. Air enters the core inlet duct 28 formed in a duct body 30. Dirt or other impurities may be ejected outwardly of outlet or particle separator 110. Turning vanes 112 assist in turning the air flow into a compressor section 114. A combustor 116 is positioned downstream of the compressor 114 and a turbine section 118 is downstream of the combustor 116. The core engine 130 is mounted on a centerline C which is offset relative to a centerline A about which the fan 26 rotates.

A free turbine 120 receives the products of combustion downstream of the turbine section 118 and is driven to rotate to, in turn, drive a shaft 128 and then drive the fan rotor 26 through a gear reduction 131.

As illustrated, moving further into the aircraft engine along the axis A, the first rotating element is the fan 26, then the free turbine 120, then the core engine turbine 118 and core engine compressor 114. The non-rotating combustor 116 is between the rotating core turbine 118 and compressor 114.

As can be appreciated from FIG. 3, the core exhaust nozzle 44 is not centered on axis A but instead is largely on a vertically upper side of axis A.

In addition, core engine components, including core turbine and core compressor sections and the combustor, are oft referenced as a gas generator portion of the engine. In the illustrated configuration, a propulsor portion of the engine would include the free turbine 120 and fan 26. However, other component groupings and descriptors may be utilized without limiting the nature or scope of the disclosed embodiments.

In this arrangement, the engine exhaust 44 is above the wing 22, whereas the core inlet duct 28 is below the wing. This provides improved lift for the engine. Further, the disclosed arrangement results in a very compact engine and one which is well integrated into the aircraft wing.

In a method, air enters an inlet of a fan 26 along a first direction, and air enters a core duct inlet 28 at a location radially offset from a center axis A of the fan, with a free stream of airflow entering the core inlet duct, and then being turned along an acute angle in a direction C having at least a component in a reverse direction relative to the center axis A, and having a component in a direction radially toward the center axis A. The air then passes through a core engine 130, to sequentially travel through a compressor section 114, a combustor 116, and a turbine section 118.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a fan inlet duct and a fan configured to deliver air to an exhaust nozzle, said fan inward of said fan inlet duct;
   a core gas turbine engine, including, in serial order extending further into the engine relative to the fan inlet, a core turbine section, a combustor and a core compressor section;
   a core engine inlet duct spaced from said fan inlet duct relative to a fan radial center, and for delivering air into the core compressor section; and
   said core turbine engine is centered along a first axis and said fan rotating about a second axis, and said first and second axes being non-parallel.

2. The gas turbine engine as set forth in claim 1, wherein a core engine inlet duct extends to a turning section wherein the air is turned to communicate with the core compressor section.

3. The gas turbine engine as set forth in claim 2, wherein a particle separator is positioned to allow removal of impurities from the air prior to it turning into the core compressor section.

4. The gas turbine engine as set forth in claim 1, wherein said outlet nozzle is not centered about an axis of said fan, but rather is positioned to be larger on one side of said axis of said fan.

5. The gas turbine engine as set forth in claim 1, wherein a free turbine is positioned downstream of said core engine turbine, and said free turbine receiving products of combustion from the core engine turbine, and driving said fan.

6. The gas turbine engine as set forth in claim 5, wherein said free turbine drives said fan rotor through a gear reduction.

7. An aircraft comprising:
   a wing, and said wing mounting an engine;
   the engine including a fan inlet duct and a fan configured to deliver air to an exhaust nozzle said fan inward of said fan inlet duct, a core gas turbine engine including in serial order extending further into the engine, a core turbine section, a combustor and a core compressor section, a core engine intake duct;
   said exhaust nozzle being vertically above a leading edge of the wing, and said core engine inlet duct being vertically below the leading edge of the wing;
   said core engine inlet duct for delivering air into said core compressor section; and
   said core gas turbine engine is centered along a first axis and said fan rotating about a second axis, and said first and second axes being non-parallel.

8. The aircraft as set forth in claim 7, wherein a core engine inlet duct extends to a turning section wherein the air is turned to communicate with the core compressor section.

9. The aircraft as set forth in claim 8, wherein a particle separator is positioned to allow removal of impurities from the air prior to it turning into the core compressor section.

10. The aircraft as set forth in claim 7, wherein said outlet nozzle is not centered about said second axis but rather is positioned to be larger on a vertically upper side of said second axis.

11. The aircraft as set forth in claim 7, wherein a free turbine is positioned downstream of said core engine turbine, and said free turbine receiving products of combustion from the core engine turbine, and driving said fan.

12. The aircraft as set forth in claim 11, wherein said free turbine drives said fan rotor through a gear reduction.

* * * * *